Sept. 29, 1970  M. D. ALTFILLISCH  3,530,719
PRESSURE TRANSDUCERS

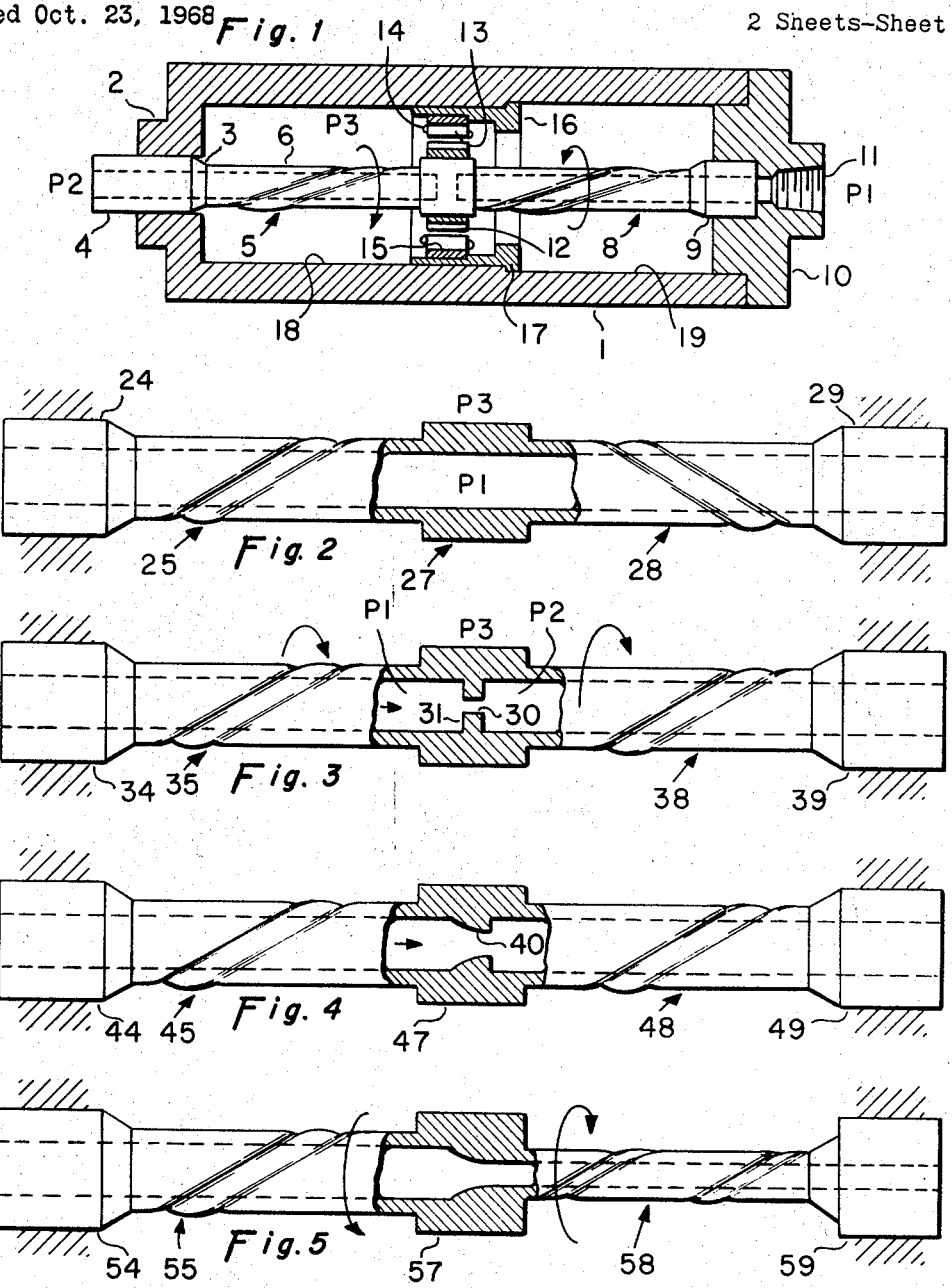

Filed Oct. 23, 1968  2 Sheets-Sheet 2

INVENTOR.
MICHAEL D. ALTFILLISCH
BY Kenway, Jenney & Hildreth

ATTORNEYS

United States Patent Office 3,530,719
Patented Sept. 29, 1970

3,530,719
PRESSURE TRANSDUCERS
Michael D. Altfillisch, Canton, Mass., assignor to Electrosyn Technology Laboratories, Inc., Canton, Mass., a corporation of Massachusetts
Filed Oct. 23, 1968, Ser. No. 769,854
Int. Cl. G01l 9/10
U.S. Cl. 73—398                               9 Claims

ABSTRACT OF THE DISCLOSURE

The pressure transducer disclosed herein employs an elongate transducting element having a pair of helically twisted tubular elements which are aligned and rigidly connected together so that the point at which they are joined rotates to an extent which is a function of the algebraic sum of respective torque components.

My invention relates to transducers, and particularly to a novel pressure transducer for making highly repeatable pressure measurements over a large range of pressures.

In many process monitoring and control applications it is desired to measure pressure accurately, either as such, or as an accurate measure of some other variable such as volume, temperature or rate of flow. Such measurements must frequently be made in highly corrosive environments, at very high pressures, or over a wide range of temperatures and pressures. And, particularly where cumulative error must be minimized, as in gas pipeline monitoring, highly repeatable measurements are desired. The objects of my invention are to improve the precision and linearity of pressure transducers, to improve the repeatability of pressure transducer output signals, and to increase the range of pressure transducers.

The above and other objects of my invention are attained by a novel pressure transducer of monolithic construction in which the pressure sensing output member is mounted for movement in free response to applied pressures, without the necessity of bearings. For this purpose, the output member is mounted between two helically twisted hollow tubes of metal or the like. The free end of each tube is secured, as by welding, to a common support member. By this arrangement, the output member receives a torque depending on the applied pressures and tending to rotate it about the axis of the tubes with respect to the support member. Depending on the nature of the measurement to be made, the two twisted tubes may be in communication, or not, as will appear. The output member may be coupled to any suitable signal generator, but in accordance with a preferred embodiment of my invention has rotor teeth formed on it to cooperate with a wound stator connected to the support member, the stator and rotor comprising a rotary differential transformer. Alternatively, other known shaft angle transducers may be employed as the output signal generator. For example, in accordance with one embodiment of my invention, the output signal generator may comprise a strain gauge bridge mounted on the output member and being unbalanced by torsional deformation of the output member in response to torques produced by the twisted tubes.

The details of the apparatus of my invention, and its mode of construction and operation, will be made clear by the following detailed description, together with the accompanying drawings, of various illustrative embodiments thereof.

In the drawings,

FIG. 1 is an elevational view, with parts shown in cross-section, of a pressure transducer in accordance with one embodiment of my invention;

FIG. 2 is a schematic elevational view, with parts shown in cross-section and parts broken away, of a modification of the transducer of my invention;

FIG. 3 is a schematic elevational view, with parts shown in cross-section and parts broken away, of another embodiment of my invention;

FIG. 4 is a schematic elevational view, with parts shown in cross-section and parts broken away, of another embodiment of my invention;

FIG. 5 is a schematic elevational view, with parts shown in cross-section and parts broken away, of another embodiment of my invention;

Figure 6:
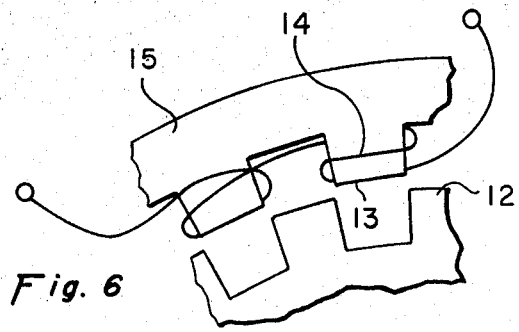
FIG. 6 is a fragmentary elevational view of the apparatus of FIG. 1, illustrating further details of the output signal generator.

FIG. 1 shows a pressure transducer in accordance with one embodiment of my invention for measuring the differential between two pressures P1 and P2. The apparatus comprises a housing 1, of metal or the like, that may be conveniently machined from hexagonal stock. Of course, housings of other outer cross-sections could be employed, but the hexagonal cross-section facilitates holding the housing during installation of the transducer.

The housing 1 is formed with an end flange 2 drilled as indicated at 3 to receive the end portion 4 of a first twisted tube generally designated as 5. The cylindrical end portion 4 of the tube 5 may be secured to the flange 2 in any conventional manner, as by welding, brazing or the like. The tube 5 is helically twisted, as suggested at 6, in a conventional fashion, such that when the pressure inside the tube 5 is greater than the pressure outside the tube, a torque that will be clockwise when viewed from the left in FIG. 1 will be produced.

The protruding portion of the end 4 of the tube 5 may be provided with threads or other conventional means for securing the tube to a conduit, or into the wall of a chamber, containing fluid at the pressure P2 to be measured with respect to the pressure P1. The inner end of the tube 5 is formed integral with an output member 7, which may be made from the same stock as the tube 5. Integrally with the other side of the output member 7 is formed a second twisted tube generally designated as 8, extending outwardly to an enlarged cylindrical end portion 9 welded or otherwise secured in an end flange 10. The flange 10 may be secured to the housing 1 in any conventional manner, as by threads, not shown. As indicated at 11, the end flange 10 may be provided with a pipe thread to facilitate connection to a source of fluid at the pressure P1 to be measured with respect to P2. The two tubes 5 and 8 and the output member 7 together form a transducing element.

The output member 7 is connected to a signal generator. As here shown, the signal generator is a rotary differential transformer having a rotor 12 secured to the output member 7. The rotor 12 comprises a set of ferromagnetic teeth confronting and cooperating with ferromagnetic teeth formed on the stator 13 of the differential transformer. Windings 14 are arranged on the teeth of the stator 13 in a conventional manner. When the windings are excited by a suitable reference source of alternating voltage, an output signal will be produced having a magnitude proportional to the rotated angle of the rotor with respect to a reference null position, and a phase determined by the sign of the deflection. The stator 13 may be secured to the housing 1 by means of an intermediate annulus 15 formed integral with the teeth of the stator and connected, as by epoxy cement or the like, to a ring 16 of insulating material or the like, also cemented to the housing 1. The ring 16 is located axially in the housing by a protruding flange 17 cooperating with a shoulder formed at the intersection of a first cylindrical bore 18 and a second larger cylindrical bore 19 in the housing 1. The terminals of the windings not shown in FIG. 1, may be led out of the housing through suitable passages in a conventional manner, not shown.

As indicated in FIG. 1, the sense of the twist of the tube 8 is such that when the pressure P1 inside the tube is higher than the internal pressure P3 in the housing 1, the tube 8 will tend to rotate the output member 7 in the sense opposite the sense of the rotation produced when the pressure P2 is higher than the pressure P3. Since the opposite ends of the tubes are held in fixed relationship by the housing, it can thus be seen the two twists must be in the same direction, as illustrated, for this opposing torque relationship. The pressure P3 may be atmospheric, as provided by a suitable vent in the housing 1, or it may be at the ambient pressure at the time of manufacture. The exact pressure is not critical, as will appear.

The spring constants of the twisted tubes 5 and 8 are made the same, as by making the tubes of the same dimensions and materials. Thus, the rotated angle $\theta$ of the output member 7 about the longitudinal axis of the tubes 5 and 8, with respect to the housing 1, will be given by the equation:

$$\theta = k(P1-P3) - k(P2-P3)$$

where $k$ is the common spring constant of the tubes 5 and 8. Obviously, the expression may be reduced to $$\theta = P1 - P2$$

and is thus independent of the housing pressure P3.

The tubes 5 and 8 may be made of any selected spring material suited to the environment, such as steel, monel metal, Ni-Span C or the like. The tubes 5 and 8, the intermediate output member 7 and the ends 4 and 9 may all be formed from the same tubular piece of stock, as by first boring the two internal holes forming the insides of the tubes, machining down the outer diameters in the region of the twisted portion, and then proceeding in the manner taught in U.S. Pat. No. 2,881,517 issued on Apr. 14, 1959 to Edward L. Carpenter et al. for Method For Twisting Tubing.

The apparatus of FIG. 1 has been found to be useful for measuring pressures over a very wide range, from ten pounds per square inch up to several thousand pounds per square inch. When calibrated for various operating ranges within the range of pressures in which the transducer is useful, accuracy as high as plus or minus one-fifth of one percent, with a repeatability of plus or minus one-tenth of one percent, has been achieved.

FIGS. 2–5 shown modifications of the apparatus of FIG. 1 suiting it for use in various particular applications.

To simplify the drawings, the output signal generator has not been shown, and the common support comprising the housing 1 and its end flanges 2 and 10 have been schematically indicated as mechanical ground. Portions of the remainder of the apparatus corresponding to parts in FIG. 1, with modifications to be described, are given the reference characters of the corresponding parts in FIG. 1 prefixed with the figure number in which they appear. Thus, the part 25 in FIG. 2 corresponds to the part 5 in FIG. 1.

FIG. 2 illustrates an embodiment of the invention designed to measure a pressure without the development of a stagnant pressure region in the fluid whose pressure is to be measured. Such a device would be highly useful, for example, where it was desired to measure the pressure of a fluid while keeping it in motion, as in a chemical reactor, distillation column, heat exchanger or the like, or where a reaction might occur within the fluid that would cause deposits blocking a conventional Bourdon tube. For this purpose, the output member 27 is provided with a central opening to permit direct communication between the tubes 25 and 28. As schematically indicated, the tubes 25 and 28 have their ends 24 and 29, respectively, fixed together to a common support, such as the housing 1 and its end flanges 2 and 10 in FIG. 1, and they may be made in the same manner as the corresponding tubes 5 and 8. However, both of the tubes 25 and 28 are twisted in a sense to cause torque in the same sense to be applied to the output member 27 when the pressure P1 inside the tubes is higher than the pressure P3 outside. Since the opposite ends of the overall transducing element are again fixed, the tubes must be twisted in opposite directions, as illustrated, to obtain this desired torque component relationship. Thus, for a pressure drop $P1-P3$ corresponding to the same pressure drop $P1-P2$ in FIG. 1, the apparatus of FIG. 2 would produce twice the output deflection angle. Moreover, the open passage from one end to the other of the apparatus makes cleaning easy, and permits a continued circulation of the working fluid at the pressure P1 through the sensing tubes.

FIG. 3 shows a modification of the apparatus of FIG. 1 adapted to measure fluid flow. For this purpose, the output member 37 is provided with a restricted orifice 30 in an orifice plate 31. Thus, fluid flowing at a pressure P1 from the tube 35 to the tube 38 will enter the tube 38 at a lower pressure P2. The tubes 35 and 38 are wound in the same senses as the tubes 5 and 8 in FIG. 1, i.e. in the same direction as illustrated, such that opposite torques are applied to the output member 37 when both the pressures P1 and P2 are higher than the pressure P3. The equation governing the output angle $\theta$ of the output member 37 will thus be the same as for the apparatus of FIG. 1, and the pressure drop $P1-P2$ across the orifice will be sensed independently of the outside pressure P3. The corresponding rate of flow may be derived from a signal proportional to this pressure difference by the application of a suitable orifice coefficient in a manner known to those skilled in the art.

FIG. 4 shows apparatus similar to that used in FIG. 3, but employing a passage through the output member 47 shaped as a flow-metering nozzle 40. The same measurements available in the apparatus of FIG. 3 are obtained, but with the better pressure recovery characteristic of a metering nozzle. The apparatus could obviously be extended in the same manner to form the orifice in the output member 47 as a full venturi section, whereby still further pressure recovery would be obtained.

As indicated in FIG. 5, it is not necessary that the twisted tubes be of the same diameter. For use, for example, as a high efficiency metering nozzle, the tube 55 is made larger than the tube 58. However, both tubes are made to have the same spring constant, as by a suitable choice of materials, wall thicknesses, or the pitch of the twisted tubes. The output member 57 is formed with a venturi entrance section 50 serving to fair the inside of the tube 55 into the inside of the tube 58, producing a desired increase in velocity useful in a nozzle while at the same time producing a pressure output signal useful as a measure of the flow rate into the nozzle.

FIG. 6 indicates schematically and in somewhat more detail the rotary transformer useable as the output signal generator in any of the apparatus of FIGS. 1–5. As there shown, the teeth on the rotor 12 of the apparatus, also shown in FIG. 1, cooperate with the teeth on the stator 13 of the transformer. Windings 14 are wound on the teeth in a manner suitable to produce a differential output signal when the teeth 12 are moved with respect to the teeth 13. As will be apparent to those skilled in the art, one tooth on the rotor 12 and two teeth on the stator 13 would be sufficient to produce an output signal, although more could be used if so desired.

Figure 7:
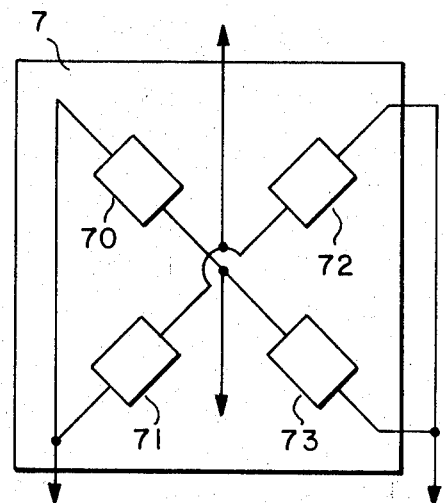
FIG. 7 is a development of the output member forming a portion of the apparatus of FIG. 1 when modified in accordance with an embodiment of my invention to incorporate a strain gauge bridge.

FIG. 7 illustrates an alternate form of output signal generator that is particularly useful in the apparatus of FIG. 1 when the input pressures P1 and P2 are the same and it is desired to measure the difference between that pressure and the pressure P3. For such a measurement, both the tubes 5 and 8 would be connected to the same source of pressure.

Figure 8:
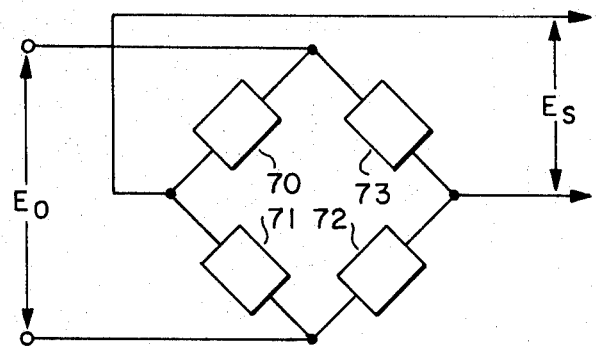
FIG. 8 is a schematic wiring diagram of the strain gauge bridge of FIG. 7.

FIG. 7 shows a plane development of the outer surface of the output member 7 on which have been mounted, as with a suitable cement, the several piezoelectric elements 70, 71, 72 and 73 of a strain gauge bridge. As is known to those skilled in the art, such a strain gauge bridge comprises thin strips of piezoelectric material bonded to the surface to be measured, and interconnected in a bridge as shown in FIG. 8. The resistance of the elements varies with stress to produce an output signal $E_s$ in response to an applied voltage $E_o$ that is linear in the applied torque, over all workable ranges of the apparatus, within .05 percent of full scale. A highly repeatable measurement of the pressure difference is thus provided.

While I have described my invention with respect to the details of several particular embodiments thereof, many changes and variations will occur to those skilled in the art upon reading my description, and such can obviously be made without departing from the scope of my invention.

Having thus described my invention, what I claim is:

1. A pressure transducer comprising:
    an elongate transducing element having first and second helically twisted elongate tube portions, which portions are substantially aligned and are rigidly connected together at a point intermediate the ends of said transducing element, a rotatable output member affixed to said transducing element at said intermediate point;
    support means for mounting the ends of said elongate transducing element in fixed relationship to each other, means for applying pressures to the insides and outsides of said twisted tube portions whereby torque components, generated in said twisted tube portions as a result of pressure differentials between the insides and the outsides of the respective tube portions, are netted and said output member is rotated to an extent which varies as a function of an algebraic sum of said pressure differentials; and
    means for providing an output signal which varies as a function of the rotation of said output member relative to said support means.

2. The transducer of claim 1, in which said signal providing means comprises a rotary differential transformer having a rotor comprising ferromagnetic teeth formed on said output member and a wound stator cooperating with said rotor and mounted on said support means.

3. The transducer of claim 1, in which a passage is formed in said output member joining said tube portions and thereby permitting fluid flow therebetween.

4. The transducer of claim 3, in which said passage is smaller in cross-sectional area than said first tube portion, whereby fluid flowing from said first tube portion to said second tube portion will leave said passage at a pressure lower than the pressure in said first tube portion, and in which said tube portions are twisted in senses to produce opposite torques on said output member when the pressure in each tube portion is higher than the pressure outside the tube portion.

5. The transducer of claim 3, in which said second tube portion is of smaller cross-sectional area than said first tube portion, in which both tube portions have the same torsional spring constant, and in which said passage is formed as a venturi entrance fairing said first tube portion into said second tube portion.

6. A pressure transducer comprising:
    an elongate transducing element having first and second helically twisted elongate tube portions, which portions are substantially aligned and are rigidly connected together at a point substantially midway between the ends of said transducing element with communication between said tube portions being blocked, a rotatable output member affixed to said transducing element at said intermediate point, said tube portions being twisted in the same direction;
    support means for mounting the ends of said elongate transducing element in fixed relationship to each other, means for applying pressures to the insides and outsides of said twisted tube portions whereby torque components, generated in said twisted tube portions as a result of pressure differentials between the insides and the outsides of the respective tube portions, are netted and said output member is rotated to an extent which varies as a function of the difference between said pressure differentials; and
    means for providing an output signal which varies as a function of the rotation of said output member relative to said support means.

7. A pressure transducer comprising:
    an elongate transducing element having first and second helically twisted elongate tube portions, which portions are substantially aligned and are rigidly connected together at a point substantially midway between the ends of said transducing element with the insides of said tube portion being in free communication with each other, a rotatable output member affixed to said transducing element at said intermediate point, said tube portions being twisted in opposite direction;
    support means for mounting the ends of said elongate transducing element in fixed relationship to each other, means for applying pressures to the insides and outsides of said twisted tube portions whereby torque components, generated in said twisted tube portions as a result of the pressure differential between the insides and the outsides of the tube portions, are summed; and
    means for providing an output signal which varies as a function of the rotation of said output member relative to said support means.

8. The transducer of claim 7 wherein said signal providing means is a rotary differential transformer.

9. A pressure transducer, comprising a first helically twisted hollow tube extending from a first end to a second end along a longitudinal axis, an output member mounted on said first end, a second helically twisted hollow tube extending along said longitudinal axis from a first end mounted on said output member to a second end, means sealing the first ends of said tubes and thereby preventing fluid flow therebetween, and support means mounting said second ends together in fixed relationship, said first tube being twisted in a sense to tend to rotate said output member in a predetermined sense when the pressure inside said first tube is higher than the outside pressure and said second tube being twisted in a sense to tend to rotate said output member in a sense opposite said predetermined sense when the pressure in the second tube is higher than the outside pressure, and a rotary differential transformer having a rotor comprising ferromagnetic teeth formed on said output member and a wound stator cooperating with said rotor and mounted on said support means.

References Cited

UNITED STATES PATENTS 2,882,503  4/1959  Huff et al.
3,013,233  12/1961  Bourns _____ 73—398
3,411,362  11/1968  Arasim _____ 73—418 XR

FOREIGN PATENTS 1,189,741  3/1965  Germany.

DONALD O. WOODIEL, Primary Examiner

U.S. Cl. X.R.

73—205, 412, 418